Aug. 4, 1970

C. A. PURDY 3,522,876

CONVEYOR SYSTEM

Original Filed Aug. 31, 1966

INVENTOR.
CHESTER A. PURDY

BY

McNenny, Farrington, Pearne & Gordon
ATTORNEYS

Aug. 4, 1970 C. A. PURDY 3,522,876
CONVEYOR SYSTEM

Original Filed Aug. 31, 1966 7 Sheets-Sheet 3

INVENTOR.
CHESTER A. PURDY
BY
McNenny, Farrington, Pearne & Gordon
ATTORNEYS

Aug. 4, 1970  C. A. PURDY  3,522,876
CONVEYOR SYSTEM
Original Filed Aug. 31, 1966  7 Sheets-Sheet 4
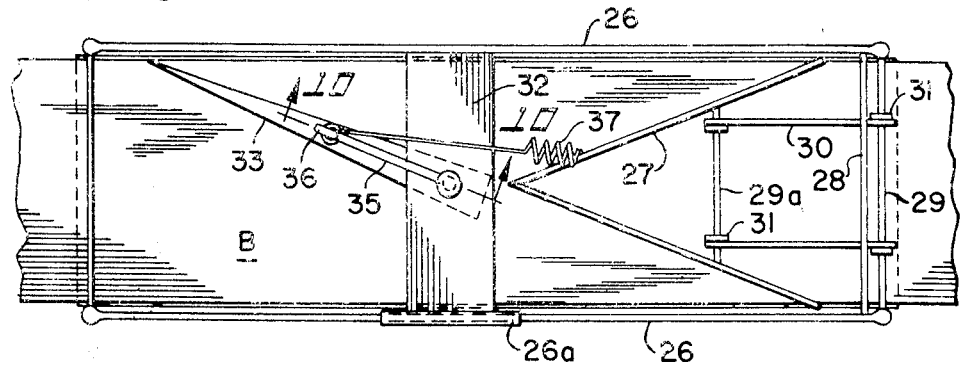
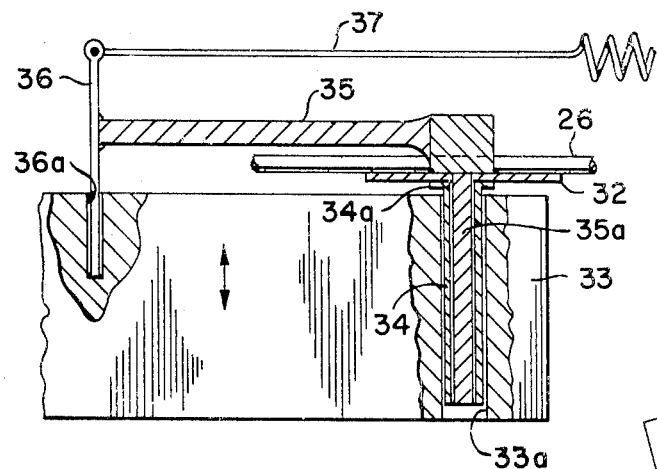
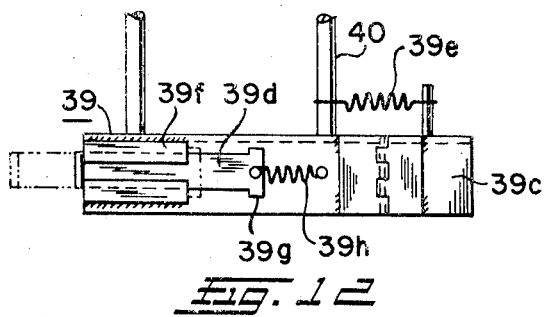
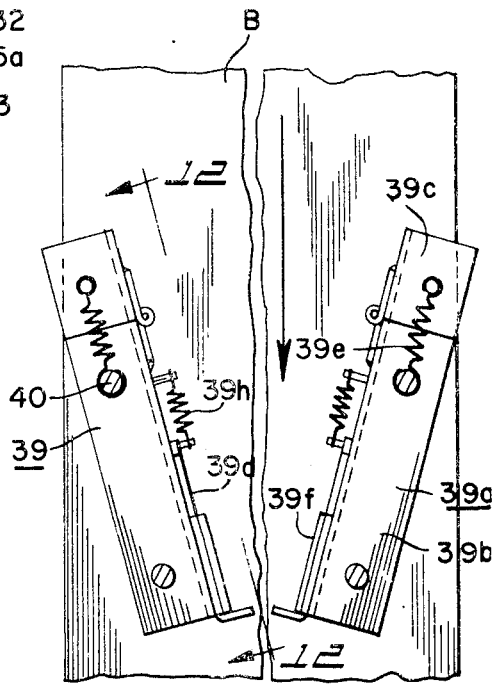
INVENTOR.
CHESTER A. PURDY
BY
McNenny, Farrington, Pearne & Gordon
ATTORNEYS Aug. 4, 1970     C. A. PURDY     3,522,876

CONVEYOR SYSTEM

Original Filed Aug. 31, 1966     7 Sheets-Sheet 5

INVENTOR.
CHESTER A. PURDY
BY
McNenny, Farrington, Pearne & Gordon
ATTORNEYS

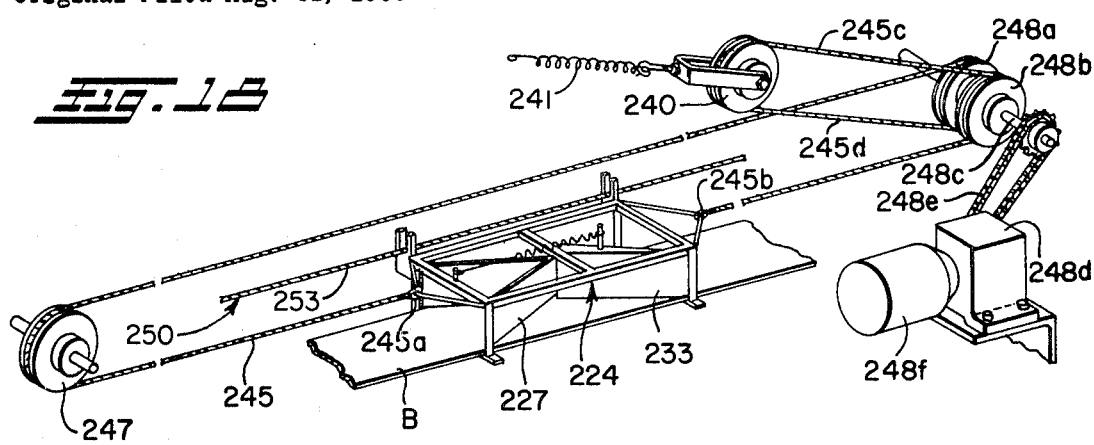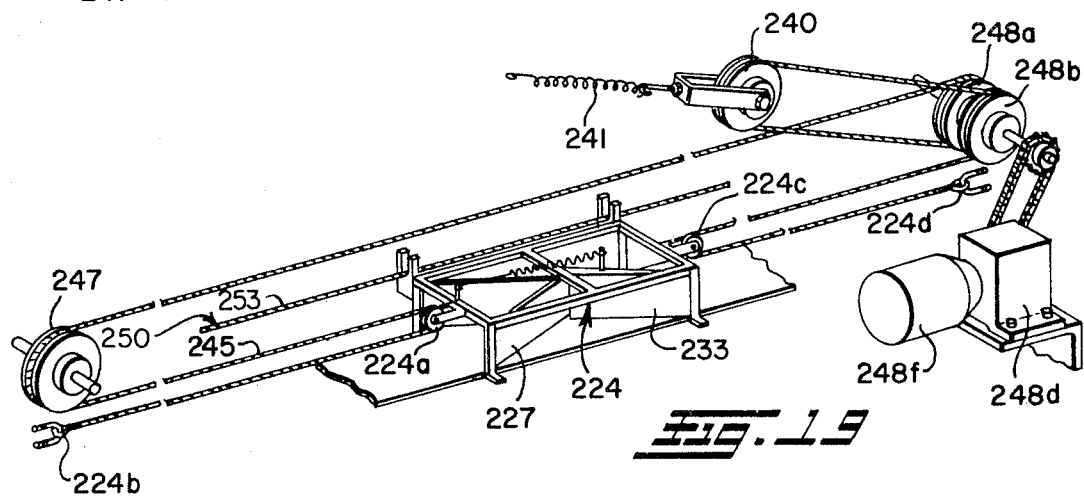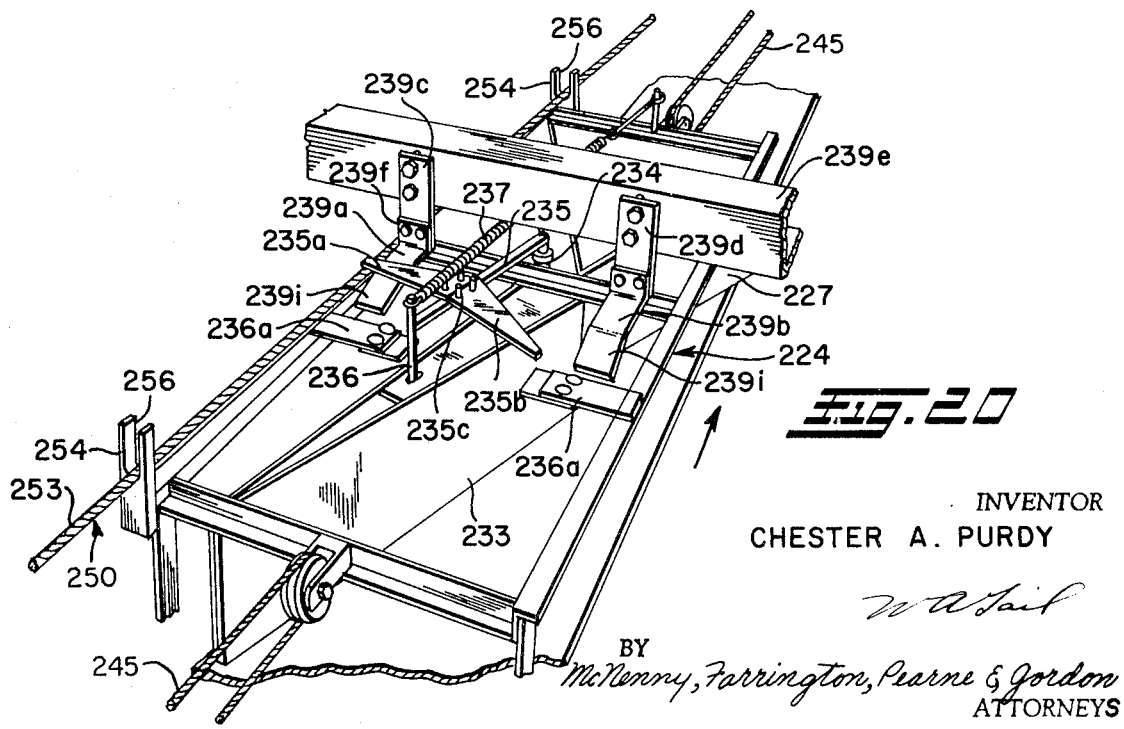

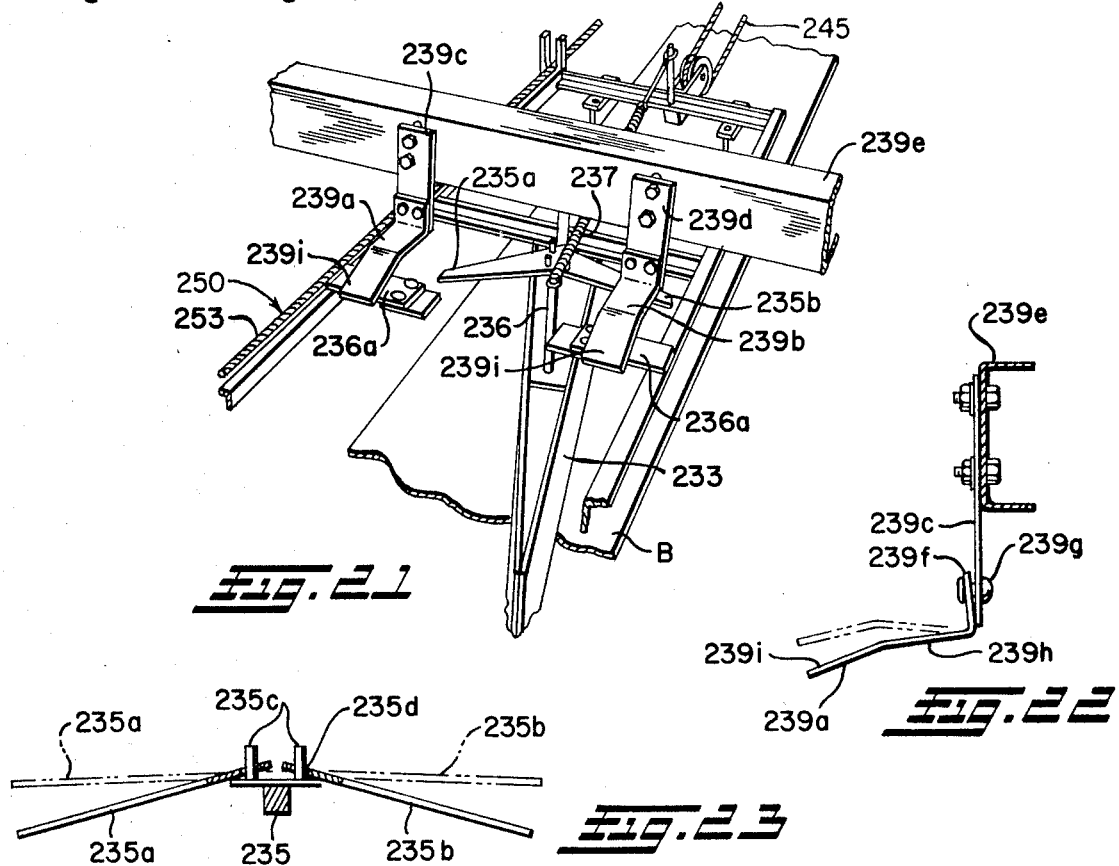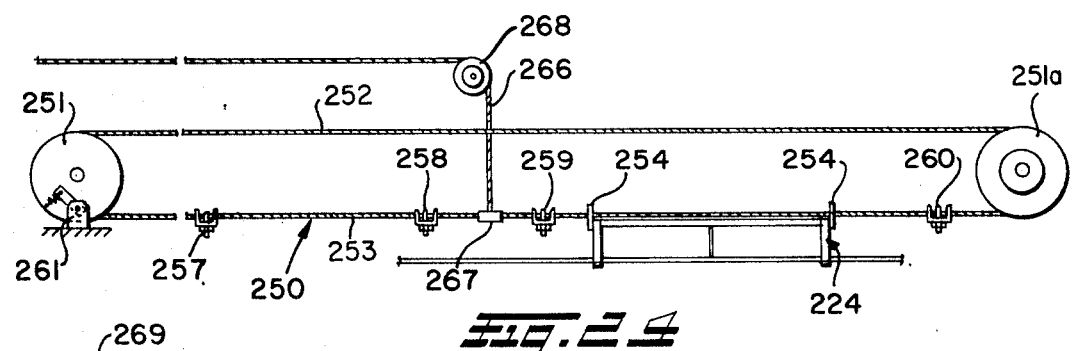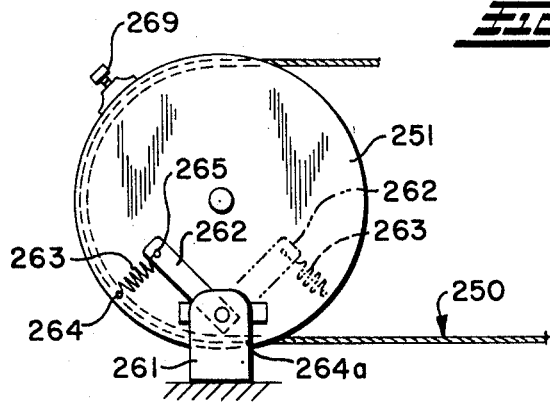

United States Patent Office 3,522,876
Patented Aug. 4, 1970

3,522,876
CONVEYOR SYSTEM
Chester A. Purdy, R.F.D. 1, Belmont, Wis. 53510
Continuation of application Ser. No. 576,447, Aug. 31, 1966, which is a continuation-in-part of application Ser. No. 393,172, Aug. 31, 1964, now Patent No. 3,306,261. This application June 2, 1969, Ser. No. 835,870,
Int. Cl. B65g *15/00;* A01k *5/00*
U.S. Cl. 198—188                                29 Claims

ABSTRACT OF THE DISCLOSURE

A continuous conveyor belt, having a planar, upper, load-bearing reach or flight extending along a predetermined discharge zone, and an associated deflector carriage are mounted and driven so that the carriage reciprocates along the belt within the discharge zone for deflecting the belt burden along the length of the discharge zone during both directions of travel of the carriage. The deflector carriage includes a base plate and a deflector or plow respectively underlying and overlying the upper flight of the belt in engagement therewith, the deflector or plow yieldably engaging the belt for deflecting the burden therefrom. The deflector may be designed to deflect the burden entirely off one side of the belt, or partially off both sides of the belt at the same time, or selectively off either side of the belt, and is preferably angularly shiftable laterally of the belt for the latter purpose. Settable means are provided for selectively and automatically reversing the direction of travel of the deflector carriage at opposite ends of the discharge zone or at predetermined points therebetween and for angularly shifting a shiftable deflector to alter the direction of burden discharge at predetermined locations along the discharge zone.

---

This application is a continuation of Ser. No. 576,447, filed Aug. 31, 1966, now abandoned, which in turn is a continuation-in-part of Ser. No. 393,172, filed Aug. 31, 1964 now Pat. No. 3,306,261.

The present invention relates to improved methods and apparatus for delivering a load or burden and, more particularly, to a method and apparatus adapted to uniformly deliver and discharge a burden such as animal feed into a feedbunk or the like.

Although the mechanized planting and harvesting of farm crops have taken long strides within recent years, there has not been a commensurate reduction in the labor involved in the daily feeding of farm animals. For large herds this can be a formidable task.

Normally, a farm wagon carries animal feed for hand delivery into a feeding bunk at intervals along its length. This is obviously quite time and labor consuming. Augers have also been used to advance animal feed lengthwise of a feedbunk. However, the equipment based on the auger principle is not only more expensive and more difficult to maintain, but such equipment has limited capacity and speed, and tends to wear rapidly. Also, augers do not work well in moving feed "uphill," although most feedlots are preferably tilted to promote drainage. Further, the feed itself tends to jam auger equipment as well as automatically to undergo segregation with the finer and heavier material as, for example, grain and supplement, falling through openings under the input end of the auger equipment, while the coarser and lighter material moves to the farther end.

In accordance with the present invention, a delivery belt or the like carries the feed directly from a silo or other storage place throughout the length of a feedbunk where, in cooperation with a diverter that traverses a selected portion of the delivery belt path, the feed is discharged from the belt in a uniform manner into the feedbunk. The diverter may, if desired, be mounted to deliver selectively to one side or the other or, alternatively, to both sides. Also, the divereter may be caused to function along all or any part of the length of the feedbunk. Still other advantages are embodied in the present method and apparatus as hereinafter will be apparent.

It is, therefore, a principal object of this invention to provide an improved method and apparatus for delivering a load or burden to an area of use and discharging the load substantially evenly in such area.

Another object is to provide an improved method and apparatus capable of distributing feed containing mixed rations of differing textures and particle sizes and shapes without separation or segregation of such rations, so that the mixture components are discharged in the same proportions over the entire length of a feedbunk.

A further object is to provide an improved method and apparatus for delivering feed to a relatively large number of farm animals wherein the apparatus can be mechanized to require a minimum of personnel supervision.

A still further object is to provide a method and apparatus for distributing feed to any preselected section of a feedbunk without necessarily loading the other sections of the feedbunk.

A still further object is to provide a feedbunk structure and feed delivery system having natural protection against windage loss, particularly of the more valuable, fine portions of the feed.

A still further object is to provide a highly flexible and versatile, semi-automatic feeding apparatus, which nevertheless has simply constructed component parts that are readily available to a farmer, with a view to simplifying the problems of replacing parts and of on-the-scene repair and maintenance of the apparatus to the greatest extent possible.

A still further object is to provide a novel and improved conveyor means including a shiftable diverter assembly wherein automatic means are provided to shift the diverter when it moves in one direction past predetermined locations.

A still further object is to provide a novel and improved drive for a movable carriage.

A still further object is to provide a novel and improved conveyor including a reciprocable diverter carriage movable between end locations along the conveyor and provided with means to selectively cause automatic reciprocation at intermediate locations between such end locations.

Other objects and advantages will be apparent from the following figures and description where:

FIGS. 7 and 8 are enlarged perspective and side elevational views, respectively, of one form of diverter or plow member having a pivotal mounting;

FIG. 9 is a diagrammatic plan view of the right-hand portions of the diverter of FIGS. 7 and 8, showing the floating arrangement of a rearward deflector;

FIG. 10 is a section of FIG. 9 on the line 10—10, only certain parts being sectioned for ease of illustration;

FIG. 11 is a plan view of one cam means used with the diverter of FIGS. 8 and 9;

FIG. 12 is a view of a cam of FIG. 11 taken on the plane of the line 12—12;

FIG. 18 is a schematic perspective view of another embodiment of this invention provided with cable tensioning means to maintain the correct cable tension in the drive for the diverter;

FIG. 19 is a view similar to FIG. 18, illustrating still another embodiment of the drive for the diverter;

FIG. 20 is an enlarged, fragmentary, perspective view of the diverter illustrating a modified structure for shifting the diverter and illustrating the elements in the position they assume immediately before the shifting of the diverter;

FIG. 21 is a fragmentary perspective view similar to FIG. 20 illustrating the position of the elements immediately after the diverter has shifted;

FIG. 22 is a fragmentary side elevation illustrating a preferred structural arrangement of the trip arms for the diverter shifter of FIGS. 20 and 21;

FIG. 23 is a fragmentary side elevation illustrating the structure of the actuating arms carried by the diverter;

FIG. 24 is a schematic illustration of a modified system for reversing diverter travel at predetermined intermediate locations; and FIG. 25 is an enlarged fragmentary elevation illustrating the structure of the switch operator illustrated in FIG. 24.

In general, the present invention involves transporting a burden or the like on a conveyor, such as a continuous belt, moving unidirectionally over a predetermined distance. Simultaneously, a diverter resting lightly on the belt of its own weight or otherwise pressed lightly against the belt is reciprocated back and forth through this predetermined distance. The relative speeds of the conveyor and reciprocated diverter are coordinated in the preferred embodiment so as to engage the diverter with the burden during both directions of the diverter's reciprocation in order continuously to discharge the burden laterally of the conveyor. If the "ground" speeds of both the diverter and conveyor are constant, the diverting or plowing rate changes upon reversal of direction of the diverter. This change may be minimized by varying the diverter's speed to compensate for such reversals of direction or merely to adjust, as may be desired, the rate of discharging the burden.

The diverter normally embodies a plow which is angularly positioned with respect to its direction of travel to effect a lateral discharge of the burden from the conveyor. Optionally, this angular position can be periodically reversed so as to discharge the burden from alternate sides of the conveyor. A control may also be employed to vary the length of travel of the diverter within its maximum limit of horizontal linear travel.

STRUCTURE

Figure 1:
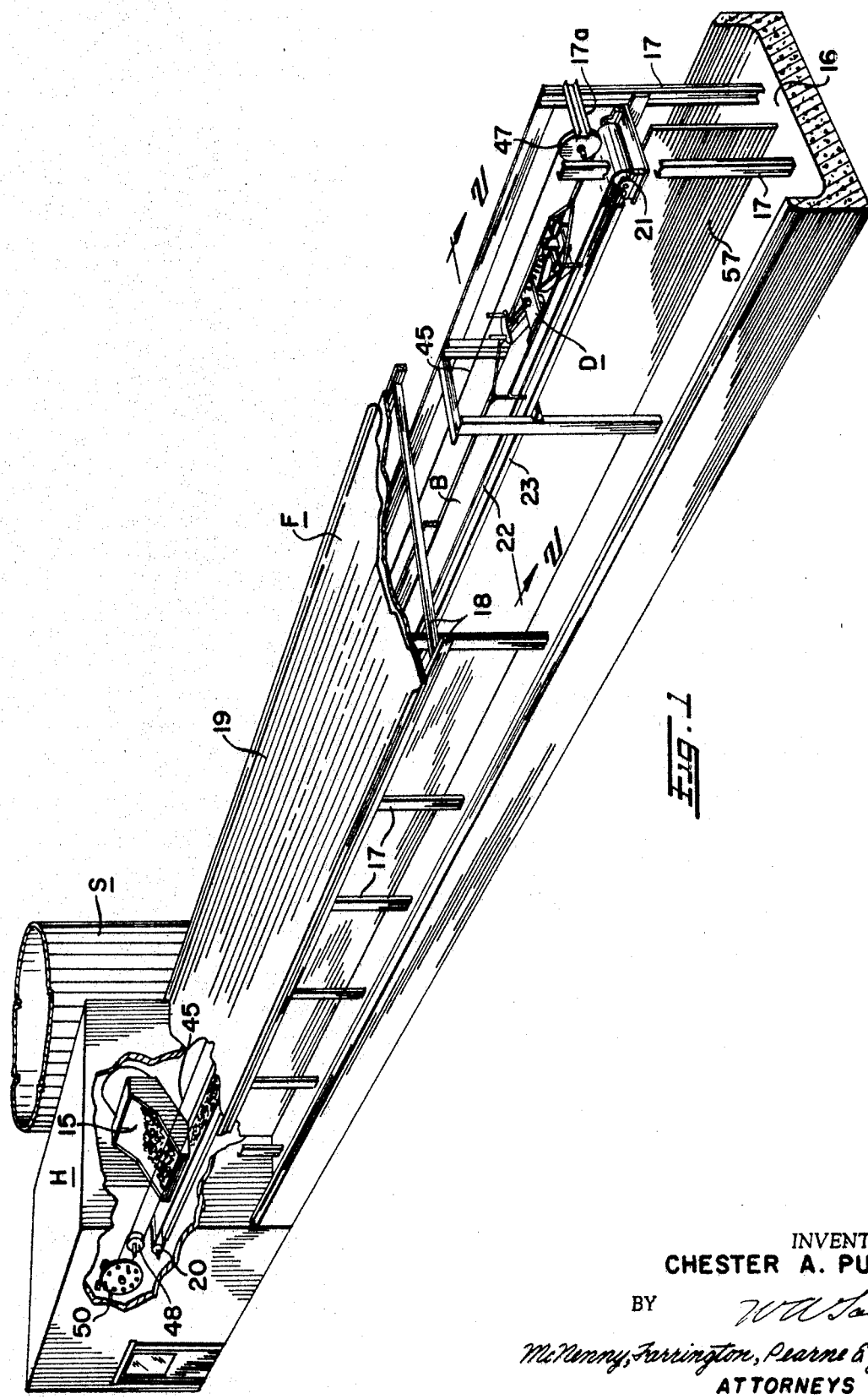
FIG. 1 is a perspective view of one form of the present delivery apparatus with parts removed.
Figure 2:
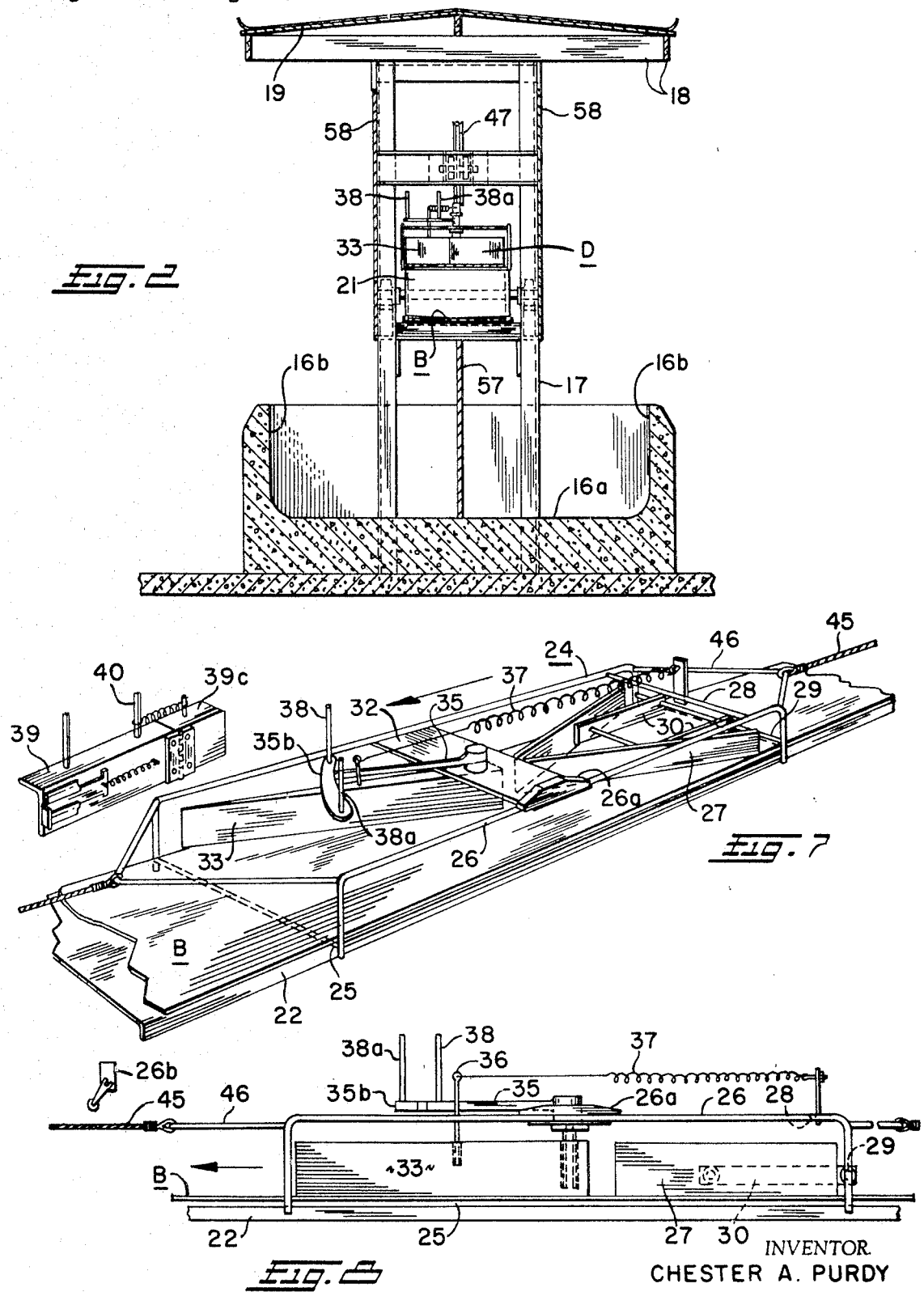
FIG. 2 is a transverse section on the line 2—2 of FIG. 1, illustrating a diverter positioned over a delivery belt.

Referring principally to FIGS. 1 and 2, a feedbunk F may extend a hundred feet or more from a feed house H adjacent a silo S into a feeding yard. The feedbunk is designated to feed cattle or other animals from either side thereof and may constitute a barrier between separate pens and/or extend along a series of separate pens if desired. (Also, see FIG. 17 referred to in more detail hereinafter.)

The major portion or all of the feed to be supplied to the delivery system is normally delivered onto a load carrying reach of a flat conveyor belt B through a chute 15 or by supplementary conveyor (not shown), or the like, advancing feed from the source of supply S. The belt B carries the feed along the length of the feedbunk F and automatically discharges it to one side or the other, or to both sides alternatively, and at any desired intervals or continuously along the length of the feedbunk.

More particularly, the feedbunk F includes a trough 16 which conveniently may be constructed of precast concrete sections, although any equivalent construction may be used. As shown (FIGS. 1 and 2), the trough 16 is defined by a longitudinally extending bottom portion 16a between laterally spaced, upstanding, opposite side walls 16b. A series of posts 17 set into the concrete, or rigidly mounted thereon in any desired manner, are spaced longitudinally of the trough 16 and carry beams 18 which in turn support a roof 19. A roller or "head pulley" 20 mounted at one end of the conveyor and a similar roller 21 mounted at the other end of the conveyor carry the continuous delivery belt B. A pair of horizontally disposed beds or platforms 22 and 23, having side margins turned toward each other, are supported by the posts 17 and extend for about the entire horizontal length of the belt B. The platforms 22 and 23 may partially support and guide the upper and lower flights or reaches, respectively, of the belt. The belt B may be conventionally and continuously driven, as by an electric motor (not shown) suitably coupled to a shaft of one of the rollers 20 or 21.

A diverter assembly, generally indicated at D, overlies the upper flight of the belt B and reciprocably moves back and forth along a substantially planar discharge reach of the load carrying upper flight of the belt. The discharge reach may constitute the major extent of the horizontal length of the belt B, although the diverter travel can be adjusted for shorter distances of travel as hereinafter described. As illustrated, especially by FIGS. 7 and 8, the diverter assembly D may comprise a frame or carriage, generally indicated at 24, including a bottom plate 25 over which the belt is threaded and having tubular, inverted U-shaped sides 26 defining lateral openings for the discharge therethrough of animal feed.

If the diverter plow or like member is held away from the surface of the belt by even a small amount, fine material is not diverted but continues on with the belt. An even more serious difficulty results from intermediately sized fibrous material becoming wedged in any opening between the diverter member and belt, building up in front of the diverter member to a point of interfering with or preventing even a normal diverting action. The diverting action is of course dependent upon the differential in friction forces between that of the animal feed against the belt and that of the feed against the diverting member. A highly successful operation has been obtained when the relatively light diverter member is permitted to ride freely upon the belt, restrained only against the thrust of the material and the belt, and the load carrying reach of the belt is uninterruptedly planar as shown.

FIGS. 7 to 10 illustrate one preferred form of the diverter assembly wherein the belt is threaded between a base or bottom plate 25 and a diverting structure designed to ride in contact with the belt but in a floating, vertically moving fashion. Referring to these figures, a V-shaped deflector 27 is flexibly held adjacent one end of the frame 24, so that the deflector rests lightly on the belt B. A cross-strip 28 and the hinge pin 29 connect downwardly turned ends of the tubular sides 26. Bars 30 are free to pivot on pin 29 as well as on a forward pivot pin 29a fixed at its ends to the diverging sides of the deflector 27. Collars 31 retain the bars 30 in position on the pins 29 and 29a. In this manner the deflector 27 and its supporting assembly are free to pivot in a vertical direction about the rear pin 29.

Another cross-strip 32 carried by the tubular sides 26 pivotally supports a shiftable diverter in the form of a vane or plow 33 adjacent the opposite end of the frame 24 for swinging actuation about an axis substantially normal to the plate 25 and located forward of the apex of the V-shaped deflector 27. The diverter vane 33 is thus adapted to assume a plurality of angular positions with respect to the length of the belt B and is especially adapted alternately to pivot between two side positions of linear alignment, respectively, with the diverging sides of the V-shaped deflector 27. The vane 33 is constructed in the form of a narrow based triangle and is provided with a bore 33a near the base to receive a hollow shaft 34. The hollow shaft 34 has a collar 34a at its upper end and is suitably secured to and supported by cross-strip 32. The bore in vane 33 fits loosely on shaft 34 so that vane 33 may fall freely and like the deflector 27 rest lightly on the belt.

Atop the cross-strip 32, an enlarged end of an arm 35 is fixed to a pivot pin 35a which extends downward into the hollow shaft 34 and is suitably journaled therein. The arm 35 extends in line with the vane 33 and terminates in a horizontal T-section 35b. A vertical pin 36 extends through and is fixed to the arm 35 near the T-section, telescopically entering with a loose fit into a bore in the top of vane 33. A coil spring 37 connects an upward extension of the pin 36 to the far end of the frame 24, as illustrated, for urging the diverter vane 33 toward either of its alternate side positions from a dead center position.

The T-section 33a carries at its ends two vertical pins 38 and 38a which are engageable with cam means located at either end of the "run" of the diverter assembly D. The cam means may take the form of an angle iron 39, suitably supported from the frame structure by rods 40 at a longitudinal angle, so that the outer face of the vertical flange (FIG. 7) may engage the pin 38 to actuate the vane from right to left when moving in the direction of the arrows (FIG. 7 and FIG. 8). As shown in FIG. 11, an opposing cam 39a of the same structure as cam 39, except for being a mirror image, is placed at a complementary angle directly opposite to cam 39 so as to engage pin 38a and actuate the vane from left to right, when facing in the direction of the arrows. With this arrangement of pins and cams, movement of the diverter assembly is the only source of power required to actuate the diverter vane 33 from side to side.

Cams 39 and 39a are each constructed in three sections, namely (FIGS. 11 and 12), a normally fixed section 39b (held by the rods 40), a hinged section 39c, and an L-shaped extensible section 39d which is normally retracted by the spring-return 39h. A coiled spring 39e secured to a rod on the fixed section and to a pin on the hinged section normally holds those parts in the position shown in FIG. 11. Strips 39f (FIG. 12) form a longitudinally extending slot which receives the extensible section 39d. The latter has a transversely enlarged stop portion 39g which prevents complete removal of the extensible section from between the strips 39f as illustrated in FIG. 12 in phantom. This arrangement of cams provides actuation of the diverter vane 33 as desired without interference from the opposing cam as hereinafter more fully described. If it is desired to divert to one side only, either cam 39 or 39a is simply lifted out of position. Cams like cam 39 and 39a may be removably mounted at various stations along the upper flight of the belt B, so that the pivoting action of the vane 33 may be accomplished when desired to divert material to either side and over any segment covered by the overall maximum horizontal travel of the diverter.

Figure 6:
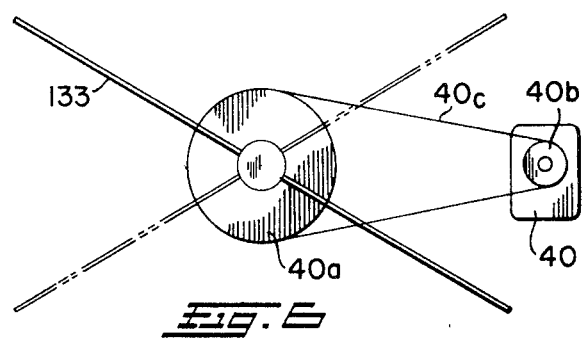
FIG. 6 is a diagrammatic plan view of one structure for changing the angular position of a diverter.

As an alternate to the cam actuation of the diverter vane or plow 33, the embodiment of FIG. 6 may be used. In this schematic illustration, a diverter vane 133 is pivotally mounted as before, but a frame carries a small, fractional horsepower, reversible, electric motor 40 with a vertically disposed drive shaft. By means of pulleys 40a and 40b and a cord belt 40c, the motor 40 may turn the vane 133 in either direction between the limiting positions shown. The wiring for the motor 40 may be movably carried by pulleys, or by line and trolley, into the house H to a source of electrical power by which the motor may be actuated as desired with the aid of known switch means.

Referring generally to the diverter assembly, there results from the various structural features shown, a number of advantages for the distribution of animal feed, such as:

(1) A track or guide for the entire diverter equipment providing virtually perfect registration without additional structural cost.

(2) A flat surface over which the belt travels, so that the belt surface is also flat thus providing, in turn, a flat surface upon which the floating diverter structure rides.

(3) A side guide or restraining means for the belt which centers the belt beneath the diverter equipment and simultaneously resists the side thrust created by the movement of the material being unloaded.

Figure 13:
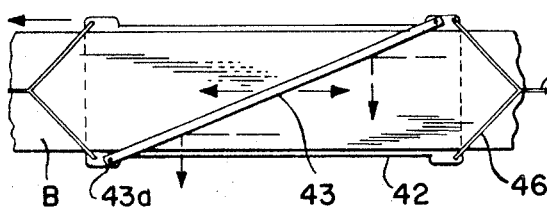
FIGS. 13 and 14 are plan views of other forms of diverters which do not pivot.
Figure 14:
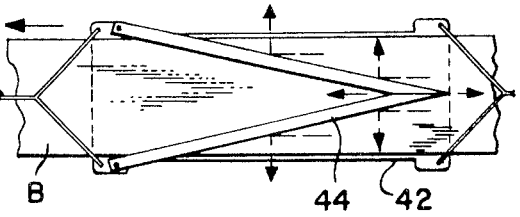

Although generally preferred, it is not necessary that a diverter vane or plow member pivot. As shown in FIGS. 13 and 14, the angularity of the plow or diverter plates can be fixed, the plates being preferably supported so as to ride freely on the belt. The belt B is also threaded between the baseboard and the diverter plates as in the case of the embodiment of FIGS. 7 and 8. In FIG. 13, the diverter is a straight plate or plow 43 extending diagonally across the baseboard 42 and adapted freely to move in a vertical direction on pins 43a in oversized holes. The baseboard 42 carries the pins 43a. In this case the diversion of feed is always to one side, as illustrated by the laterally directed arrows. In FIG. 14, a diverter plow 44 is V-shaped and, if desired, can also be carried in floating fashion. In this case, diversion is always to both sides of the belt B, as indicated by the laterally directed arrows.

The angularity of any arrangement of diverting plates with respect to the center line of the conveyor must be such as to divert with fair certainty a variety of materials having various coefficients of friction and degrees of comminution, ranging from, for example, finely ground feed stuffs to coarsely chopped fibrous materials, such as corn silage or haylage. The maximum angle for satisfactory operation is about 45 degrees, while the minimum angle is controlled by the structural and operating considerations, such as the length of the diverter. The optimum angle is of the order of 20 degrees.

Figure 3:
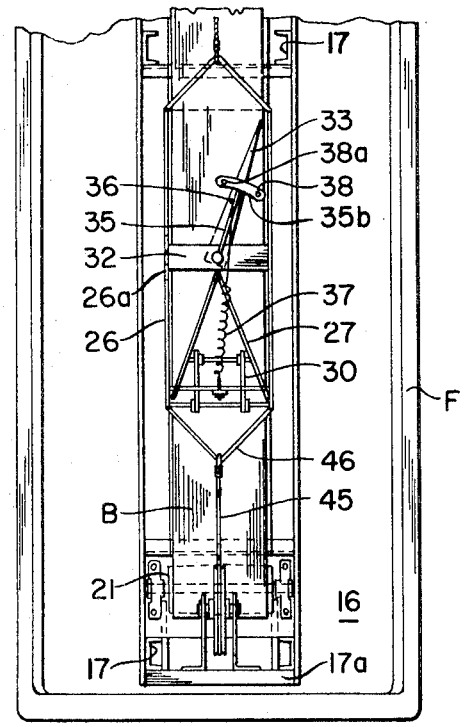
FIG. 3 is a fragmentary plan view of the outer end of the feedbunk and diverter of FIG. 2 with parts removed.
Figure 4:
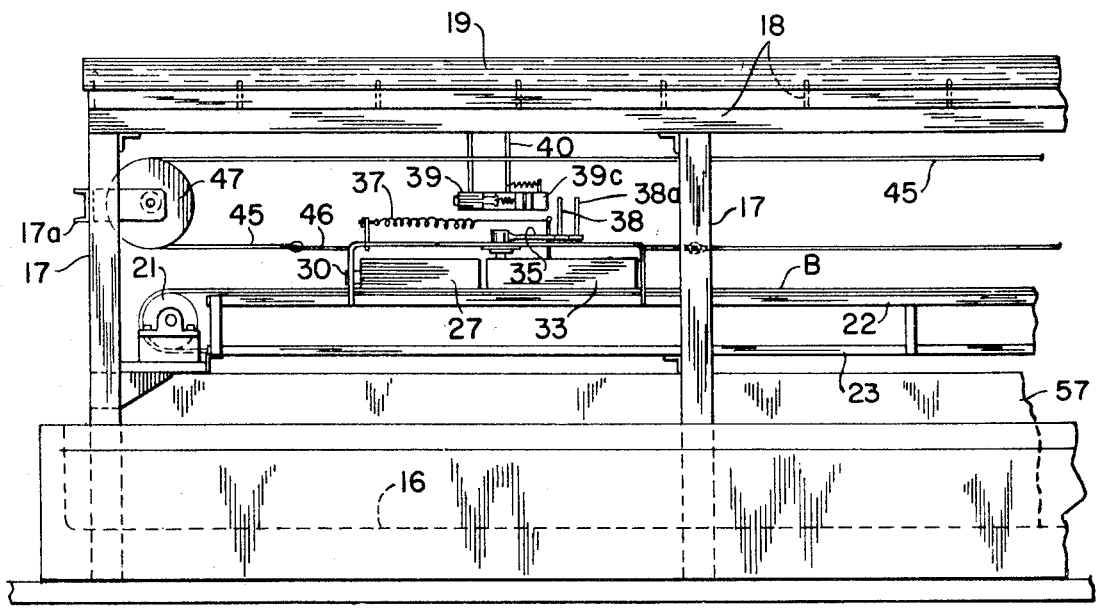
FIG. 4 is a right-hand side elevational view of FIG. 3, with the upper side baffles removed, showing the roof structure.

Regardless of the specific structure of the diverter assembly, power means are provided to reciprocate it back and forth along and substantially coextensively with the upper flight of the belt B. In the embodiment of FIGS. 1, 3, and 4, for example, opposite ends of a continuous cord or cable 45 are respectively secured by end loops to a pair of bridle wires or rods 46 connected to opposite ends of the frame 24. The cord or cable 45 is trained around a pulley 47, rotatably supported by a cross beam 17a carried by the outmost posts 17, and a capstan pulley 48 suitably mounted within the house H. If desirable, a standard pulley can replace the capstan, and any suitable power means may be employed reversibly to pull the diverter back and forth as indicated. However, the capstan is preferred in one embodiment in order to more conveniently adapt the drive for the diverter to operate through linear distances less than the entire horizonal length of the conveyor.

For instance, after making one or more loops about the capstan 48, the continuous cable or cord 46 is trained about a pulley 49 drivingly connected to a rotatable cam disc 50 having a circumference related (as described below) to a preselected maximum distance of travel of the diverter, such as the maximum horizontal length of the portion of the conveyor belt extending above the feedbunk. A plurality of holes 51 are spaced along the periphery of the disc 50, the spacing of these holes corresponding to the spacing of other diverter starting and terminal points along the discharge reach of the belt at which the diverter travel may desirably be reversed and which may be selected for programming the system of the invention to carry out a desired pattern or sequence of feed distribution. This relationship also involves the rate of rotation of the cam disc 50, which should be connected or geared to its drive pulley 49 to impart up to a few degrees less than one revolution to the cam disc during travel of the diverter over the aforementioned preselected distance.

Figure 5:
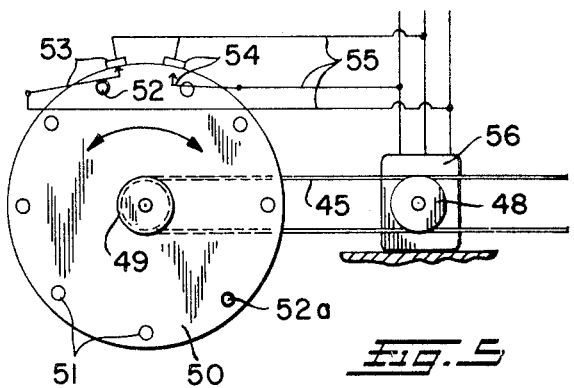
FIG. 5 is a fragmentary, semi-diagrammatic view of a control for regulating the length of movement of the diverter along a delivery belt.

One or more pins 52, serving as switch-actuators, are removably placed in selected holes 51 of the cam disc 50. Normally, open switches 53 and 54, which conveniently can be limit switches, are located to one side of the disc 50 in a position to be tripped by a switch-actuating pin 52. The switches 53 and 54 and attendant circuitry 55 are connected so as to actuate either suitable mechanical means or a standard, reversible, electric motor 56 which drives the capstan 48 (normally through a constant speed reduction means). The nature of such circuitry is well understood in the art and, therefore, is only illustrated schematically in FIG. 5 and not described here in detail. More sophisticated circuitry may obviously be used. If desired, the motor 40 of FIG. 6 can be connected in the circuitry of FIG. 5 with an electric timer, so that for each reversal of motor 56, motor 40 operates briefly in a direction opposite to a previous direction to swing the diverter plow 133 to another pivotal position. Or, in place of the electric timer, current to the motor 40 can be interrupted by having the diverter plow 133 strike a limit switch on the frame of the diverter carriage.

As a still further modification, the reciprocation of the diverter can be effected by a cam 26a carried by a side 26 of the frame. This cam 26a may trip any number of limit switches 26b (FIG. 8) which may be supported on posts 17, or the like, at strategically located stations along the feedbunk where it may be desired to reverse the direction of movement of the diverter asembly D; and a switching panel (not shown) may be employed with conventional circuitry for selectively rendering the limit switches operative at any two locations where diverter reversal may be desired.

The present feedbunk also includes certain novel structural features which are particularly useful in combination with the previously described belt and diverter structures. Referring to FIG. 2, for example, a substantially vertical baffle or partition 57 extends from below the belt B to the bottom of the trough 16 and runs substantially the length of the trough and centrally thereof. This partition extends upwardly from the bottom portion 16a of the trough 16 to a height greater than that of the trough side walls 16b for dividing the trough into two laterally spaced feeding compartments that respectively receive feed discharged from opposite sides of the belt B. Thus, feed supplied to animals feeding from the compartment on one side of the trough is kept separate from feed supplied to animals feeding from the opposite side of the trough, and the same central partition 57 further serves as a baffle for deflecting wind that might otherwise blow feed from one side of the feedbunk to the other or entirely out of the feedbunk. Baffles 58 are also desirably mounted on the posts 17 on opposite sides of the conveyor and diverter assembly so as simultaneously to diminish loss of animal feed from the belt by vintage, to prevent animals leaving a lateral clearance from the outer trough sides that is too small to permit animals to climb directly into the trough 16 yet great enough to prevent animals from rubbing their rear quarters on the structure thus discouraging the animals from standing in a position to foul the feed with excrement. As shown in FIGS. 1 and 2, the entire feed conveying mechanism, including the lower belt supporting platform 22, is disposed above and in engagement with the upper edge of the partition 57 and extends laterally to either side thereof toward the trough side walls 16b. The baffles 58 are dimensioned to extend longitudinally of the trough 16 and vertically from below the level of the upper, load carrying reach of the conveyor belt B, from which feed is discharged, to as great a height above that level as may be desired or necessary to shield the burden on the belt and the downwardly falling feed from wind and to shield the conveyor and diverter or deflecting means from being contacted by livestock feeding at the feedbunk. The baffles 58 are also spaced outwardly from the conveyor to permit feed to be discharged laterally from the conveyor to either side thereof and to fall between the conveyor and the baffles into the troughs of the feedbunk. As best shown in FIG. 2, the conveyor laterally overhangs the central partition 57 on both sides thereof, and the baffles 58 are disposed still further outwardly and above the feedbunk to prevent animals from climbing into the bunk while permitting them access to feed in the troughs.

Figure 15:
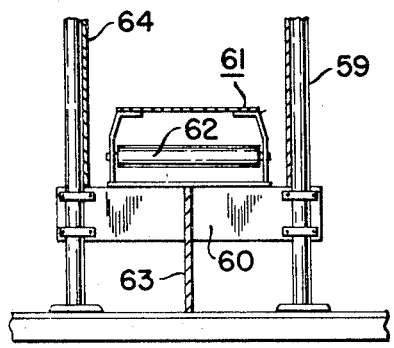
FIGS. 15 and 16 are transverse cross-sections of modified forms of conveyor supporting structures which can be installed in existing feedbunks.
Figure 16:
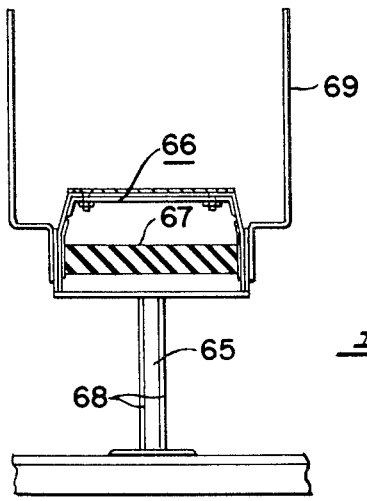

FIGS. 15 and 16 illustrate modified feedbunk structures and show only the conveyor supporting mechanism that is installed along the center line of the trough 16, the feedbunk being otherwise the same as or similar to that shown in FIG. 1. While the conveyor supporting structure shows in FIG. 1 illustrates a method of installing the support posts 17 directly into the concrete of the feedbunk at the time the concrete is poured, this often is impracticable, and modified forms illustrated by FIGS. 15 and 16 are more advantageous.

In FIG. 15, vertically extending posts 59 are spaced along the length of the trough on opposite sides thereof, and supporting cross-plates 60 extend transversely of the trough. The cross-plates 60, in turn, carry means to support the conveyor which, in this embodiment, includes a housing 61. The upper surface of the housing serves to underlie the top flight of a continuous belt for carrying feed and the like, while rollers 62, extending internally across the housing 61, are rotatably carried by its sides and serve to support the lower, return flight of the belt. A substantially vertical baffle or partition 63 extends vertically from the housing 61 to the bottom of the trough and longitudinally between successive cross-plates 60. Above the cross-plates 60 and extending from post-to-post on opposite sides of the housing are additional baffles 64. The baffles 63 and 64 perform the same functions as the baffles 57 and 58, respectively, of the embodiment of FIGS. 1 and 2.

In FIG. 16, single posts 65 are spaced substantially in-line centrally along the length of a trough and carry a belt-supporting structure comprising a housing 66. The upper surface of the housing 66 may constitute a suitable wear plate underlying and supporting the upper flight of a continuous belt. In place of the rollers in the embodiment of FIG. 11, a succession of spaced internal blocks 67 may be transversely disposed within the housing 66 to support the return flight of the belt. Substantially vertical baffles or partitions 68 extend from the housing 66 to the bottom of the trough and are fixed to the in-line posts 65 along the length of the trough. Similarly, outwardly offset baffles 69 are mounted on opposite, longitudinal sides of the housing 66. The baffles 65 and 69 reduce loss of the feed due to windage and, in addition, the baffles 69 prevent animals from climbing into the trough.

OPERATION

In operation, silage or haylage, optionally with admixed feed supplements, such as corn and commercial concentrates, cascades from the silo S or is fed by an auxiliary conveyor onto the belt B. Suitable power means (not shown) drives pulley 20 or 21 so that the upper flight of the belt moves away from the silo carrying with it the feed material. This action of the belt is continuous throughout the delivery of the feed material, the belt riding atop the bed 22 on its outer travel and atop the bed 23 on its return trip in the embodiments of FIGS. 1 to 8, or as described above in the other embodiments.

When the flow of feed has begun, the motor 56 is started for driving the diverter assembly D out and back, so as to discharge the feed laterally from the belt and into the trough 16. In the preferred embodiment, the diverter so deflects the feed during both directions of travel, although at different rates per unit of time (not necessarily per foot of bunk) according to the speed control for the diverter drive. On its outward trip (toward pulley 21), the diverter diverts the feed at a rate determined by the difference between the belt speed and the diverter speed. On its inward trip (toward capstan 48), the diverter necessarily "backs" into the feed and similarly diverts it at a higher rate determined by the sum of the belt and diverter speeds. Adjustment of the outward and return speeds of the diverter may be accomplished automatically by means known in the art, or by manual means. In any case, it will be noted from FIG. 9 that the pivot of the plow is sufficiently ahead of the apex of the deflector 27 that the feed material, in passing the pivot, strikes on the sides of the deflector and does not accumulate at the apex.

If the diverter is to travel its maximum horizontal distance, only one pin 52 need be mounted on the cam disc 50, and a hole 51 is selected for the pin so that a switch 53 or 54 is closed when the diverter is at either extreme of its horizontal travel. However, when a shorter distance of travel is desired, two pins are placed in cam disc holes 51, their circumferential spacing and locations being selected to correspond to the portion of the trough 16 to be traversed by the diverter. For example, assuming a second pin 52a is used and the disc 50 is about to be reversed by the pin 52 engaging the switch 53 to start a counterclockwise rotation of the disc as viewed in FIG. 5, the pin 52a will strike the switch 54 in due course, thereby reversing the disc rotation to a clockwise direction. This movement continues until the first pin 52 again engages the switch 53, whereupon the operation as just described is repeated. Obviously, these movements of the disc 50 are of lesser magnitude then when just one pin 52 is used alternately to engage both switches 53 and 54, and a correspondingly shorter distance of travel of the diverter assembly D along the trough 16 results. In this manner, the diverter can be caused to reciprocate back and forth along any part or all of the length of the feedbunk between preselected points along the discharge reach of the belt, while continuously discharging feed.

If a pivotal diverter is being used, cams like the cam 39 and/or 39a can be selectively and removably stationed along the trough at desired "turn-around" points for the diverter and at any desired intermediate point in order to pivot and shift the diverter vane or plow 33 at such points. The pivotal plow 33 is normally held as indicated (FIGS. 7 and 8) by the coiled spring 37 in any particular shifted position. The vane 33 moves through a dead center position while being shifted, at which point the spring 37 pulls neither to the right nor to the left. Yet the spring has sufficient pull normally to retain the vane 33 in either operative position and to insure its movement to the other operative angular position whenever it is moved across the dead center position, as by a cam 39.

Considering the operation of the cams of FIGS. 11 and 12 in greater detail and assuming a diverter traveling in the direction of the arrows of FIGS. 7 and 11, pin 38 strikes the hinged section 39c of cam 39 and is forced along the vertical flange of the cam until the pin reaches and extends, if necessary, the L-shaped section 39d. As soon as the center of the diverter vane 33 passes dead center (the central longitudinal axis of the belt), spring 37 pulls the vane the rest of the way to its other angular position. The parts are so relatively positioned that on the return trip of the diverter, pin 38 passes between cams 39 and 39b, while pin 38a hits the vertical flange of the hinged section 39c of cam 39a, pivoting it out of the way to permit the pin 38a to pass. When the diverter again approaches the cams 39 and 39a in the direction of the arrows of FIGS. 7 and 11, pin 38a engages cam 39a in the same manner, and the action as just described is repeated.

Alternatively, the motor and pulley arrangement of FIG. 6 may be used to pivot a vane or plow member. In any event, any shiftable diverter element may be actuated at selected points along and/or at either end of the feedbunk, or remain in either one of its operative positions, as may be desired, to divert feed from the belt B at uniform, controllable rates to either or both sides of the feedbunk, and along all or at only selected parts of the length thereof, according to different feeding plans as the needs arise.

Where a feedbunk is constructed to provide a feed trough on only one side of the bunk, for example, where the bunk runs along a side of only a single feed yard or pen rather than as a divider between two feed yards or pens, discharge of feed to one side only of the conveyor will be desired. In that event, shifting of a diverter will be unnecessary and the non-shiftable diverter of FIG. 13 may be used to plow feed to one side only. Where it may be desired always to supply feed at the same rate to both sides of a two-sided feedbunk, such as those illustrated and described herein, the non-shiftable diverter of FIG. 14 may be used. This diverter is especially useful for relatively coarse feeds, for example, grains.

In both of the last two situations, it will be appreciated that the travel of the diverter may also be controlled as described earlier, so that it will divert feed from the conveyor during travel of the diverter in each direction along the conveyor, and at a uniform rate determined by the relative speeds of the conveyor and the diverter. Also, the portions of the length of the feedbunk over which feed is to be distributed may be predetermined by the setting of pins in the cam disc 50 of FIGS. 1 and 5, or by the placement of the limit switches 26b of FIG. 8, which setting or placement may be easily and quickly altered from time to time as may be desired.

Figure 17:
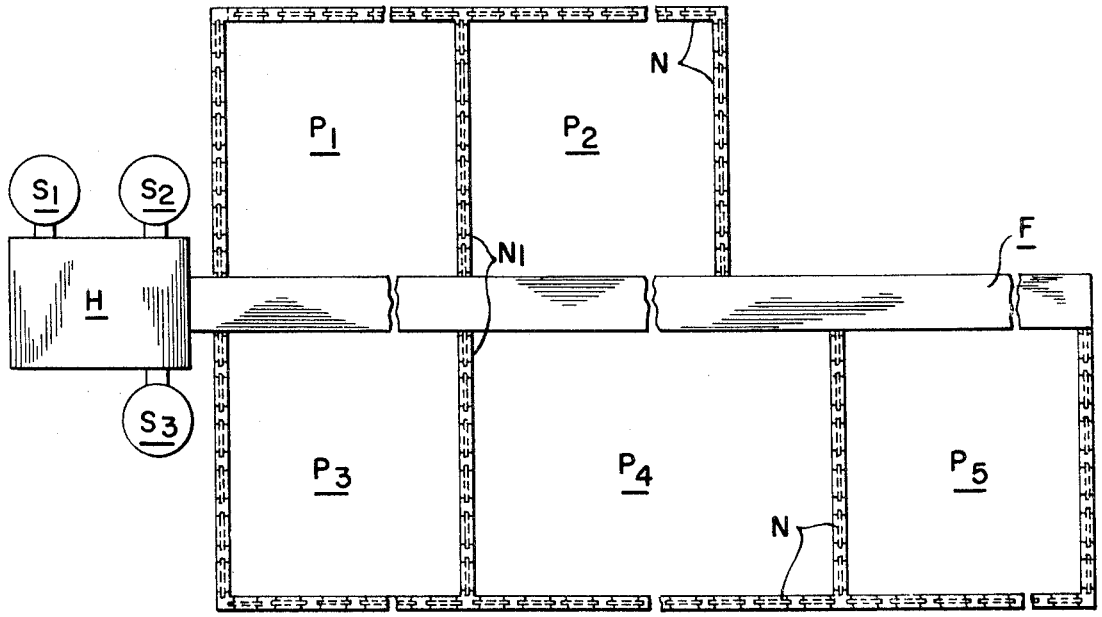
FIG. 17 is a diagrammatic layout, in plan, of an illustrative feed yard comprising an arrangement of several feed pens adjacent a feed distributing conveyor and feedbunk system of the invention for the controlled, selective distribution of feed from any or all of a number of silos or other storage or supply units to any or all of the several pens according to varying needs from time to time.

The many advantages of the invention will be better appreciated by reference to the diagrammatic showing in FIG. 17 of an illustrative feed yard incorporating the present inventions. Such a feed yard might be employed, for example, on a large cattle ranch where several classifications of mature and young cattle are to be fed according to different feeding plans in different pens $P_1$, $P_2$, $P_3$, $P_4$, and $P_5$, defined by fences N. Such a feed yard might also be employed at locations where cattle destined for slaughtering are retained and specially fed for a time to condition them just prior to slaughtering. In the latter situation, also, several classifications of cattle or groups of cattle arriving periodically may require separate feeding according to different plans or programs that are staggered in time. In both situations one or a few of the several pens may be vacant from time to time when it is necessary to supply feed to the other pens. The versatility of the present invention for handling the varying needs of such situations will become more apparent from a brief summary of how the invention may be operated to service the feed yard of FIG. 17.

For example, the present apparatus may be used to discharge feed optionally, as may be desired, to one or more of the pens of FIG. 17 according to any of the following distribution schemes. This list is intended to be only exemplary and not exhaustive.

(1-5) Diverter reciprocally traverses the length of only one of any of the five pens, $P_1$ through $P_5$ the discharge being only in one lateral direction and only into that selected pen.

(6) Diverter reciprocally traverses the feedbunk F from the house H to the end of pen $P_2$, the discharge being only in one lateral direction and only into pens $P_1$ and $P_2$.

(7) Diverter reciprocally traverses the feedbunk from the house H to the end of pen $P_5$, the discharge being in only one lateral direction and only into pens $P_3$, $P_4$, and $P_5$.

(8) Diverter reciprocally traverses the feedbunk from the house H to the end of pen $P_2$; the plow always pivoting when passing fence $N_1$, so that the discharge is only into the pens $P_2$ and $P_3$ on opposite sides of the feedbunk F.

(9) Diverter reciprocally traverses the entire length of the feedbunk from the house H to the end of pen $P_5$; the plow always pivoting when passing fence $N_1$, so that the discharge is only into the pens $P_1$, $P_4$, and $P_5$ on opposite sides of the feedbunk F.

(10) Diverter reciprocally traverses the feedbunk from the house H to the end of pen $P_1$; the plow always pivoting when approaching fence $N_1$, so that the discharge is alternately into pens $P_1$ and $P_3$ on opposite sides of the feedbunk F.

In addition, other variables may be introduced so as further to enhance the flexibility of operation of the apparatus. For instance, the out and back speeds of the diverter D (with respect to the house H) can be changed to provide different out and back discharge rates of the feed per foot of feedbunk length. Moreover, each possibility of feed distribution can be carried out for the feed from each of the silos, $S_1$, $S_2$, or $S_3$, or other feed supplies, or any combinations thereof, as when different dietary feeds are desired.

FIG. 18 is a schematic illustration of an arrangement adapted to maintain a substantially uniform tension in the cable 245 used to reciprocate the diverter 224. In this embodiment the diverter 224 is again positioned over the load bearing reach or flight of the belt B. The diverter illustrated again includes a V-shaped deflector 227 and a shiftable vane or plough 233. One end of the cable 245 connects at 245a to the end of the diverter 224 and passes over a first pulley 247 journaled at one end of the conveyor belt B. The cable then extends to and around a second pulley 248a. The cable 245 then passes around a tensioning roller 240 and back to a third pulley 248b. A tensioning roller 240, in the illustrated embodiment, is resiliently urged in a direction away from the two pulleys 248a and 248b by a spring 241. After the cable 245 passes around the third pulley 248b it extends to and is connected at 245b to the other end of the diverter 224.

The two pulleys 248a and 248b are both secured to a drive shaft 248c which is in turn driven through a gear reduction 248d, and chain drive 248e, by a suitable reversible motor, such as an electric motor 248f. When the motor 248f is operated in one direction the two drive pulleys co-rotate in a clockwise direction as viewed in FIG. 18 and cause the diverter to be moved to the left. The opposite direction of rotation of the motor produces anti-clockwise rotation of the drive pulleys and produces movement of the diverter to the right. An automatic reversing system as described in detail below or any other suitable means may be utilized to control the operation of the motor.

With this tensioning structure a uniform tension is provided in the two reaches 245c and 245d with its value determined by the tension in the spring 241. Since the friction of the roller 240 can be assumed to be quite small, the tension in these two reaches can be assumed to be equal. When the drive pulleys are rotating in a clockwise direction the reach 245d maintains the cable in tight engagement with the drive pulley 248a, so adequate driving friction is insured. However, in the event that the cable stretches, either due to load or temperature changes, while such drive is continuing slack will occur in the reach between 245b and the drive pulley 248b. This will cause a decrease in the friction against the second drive pulley and, as a result, the cable will slip relative to the second drive pulley and allow the tensioning roller 240 to take up the slack.

Conversely, when the opposite direction of drive is occurring slack or looseness in the cable will cause decreased friction with the first drive pulley 248a and allow the slack to be taken up by the tensioning roller. In either event, however, the tensioning roller 240 provides a minimum tension in the reach being fed to the pulley producing the driving force, so adequate friction is maintained on the pulley actually producing the movement of the diverter.

The tensioning roller 240 should be located with respect to the two drive pulleys so that the two reaches 245c and 245d extend back in the direction of the conveyor, so that the cable will wrap around both of the drive pulleys 248a and 248b through an angle approximately 180 degrees. Because two reaches extend between the tensioning roller 240 and the two drive pulleys the tensioning roller need only move through a distance equal to one-half the amount of the slack or stretch in the cable. For instance, if the cable stretches one foot the tensioning roller moves only six inches.

If desired, the spring 241 can be replaced by a cable extending around still another pulley and provided with a weight at its end. In that event the tension maintained in the two reaches is determined solely by the size of the weight and the tension is not changed as the tensioning roller moves back and forth. However, in most instances, a spring provides sufficient take-up capacity to compensate for slack occurring either by cable stretch or changes in the length of the cable produced by temperature changes.

In FIG. 19 a structure is illustrated which is quite similar to the structure of FIG. 18. However, in this instance the cable 245 passes over a fourth pulley 224a on the diverter 224 and is anchored at 224b near the first pulley 247. Similarly, a fifth pulley 224c is provided at the other end of the diverter and the other end of the cable is anchored at 224d near the drive pulleys. With this arrangement the force applied to the diverter by the cable is substantially twice as great as the tension in the drive side of the cable, so in a given installation the tension in the cable is reduced by approximately one-half. This arrangement is particularly desirable in larger installations where drive loads are greater. It also has the advantage of causing diverter movement at a speed equal to one-half of the speed of cable movement, so the gear reducer 248d need not provide as much reduction.

FIGS. 20 through 23 illustrate a modified structure for the shifting of the shiftable portion of the diverter. In this embodiment the diverter 224 is provided with a V-shaped deflector 227, preferably mounted in a manner similar to the mounting of the deflector 27 illustrated in FIG. 9. Mounted forwardly of the V-shaped deflector is a shiftable diverter vane 233 pivoted on the frame for rotation about a pivot 234. An arm 235 projects forwardly from the pivot 234 to a vertically extending rod 236 which again projects down through the vane 233. A spring 237 operates to bias the diverter vane toward one or the other of its shifted positions. Opposed bumpers 236a are mounted on the frame of the diverter to engage the rod 236 and cooperate with a spring 237 to hold the vane in each operative position.

The shifting of the vane 233 is accomplished by an assembly including a pair of trip arms 239a and 239b respectively secured to depending plates 239c and 239d, respectively. These plates are each secured to a cross beam 239e on the conveyor frame. The structure of the trip arms and their mounting on the beam 239e is best illustrated in FIG. 22. The trip arm includes an upstanding flange 239f through which a pair of loose bolts or rivets 239g extend. The various proportions are arranged so that the lower edge of the upstanding flange engages the plate 239c below the bolts 239g and normally maintains a first horizontally extending portion 239h in the position illustrated in full line. The trip arm also has a second portion 239i extending downwardly from the outer end of the first portion 239h. Normally gravity maintains the trip arms in the full line position of FIG. 22, but because of the loose mounting of the bolts 239g it is free to raise to the phantom line position of that figure.

Mounted on the arm 235 are a pair of similar but opposite actuator arms 235a and 235b. Each of these arms is mounted as best illustrated in FIG. 23 on a pair of pins 235c which extend with a loose fit through holes 235d in the respective arms. As illustrated in FIG. 20 each arm is provided with a pair of pins 235c spaced axially along the arm 235 so that the arms are restrained against substantial horizontal movement with respect to the vane 233 while being permitted to raise from the normal position illustrated in full line in FIG. 23. The various elements are proportioned so that as the diverter 224 is moved in the direction of the arrow in FIG. 20 the actuator arm 235a engages the upper surface of the portion 239i on the trip arm 239a and rides up along the arm until it engages the upstanding flange 239f. When this occurs continued movement of the diverter carriage causes the diverter 233 to shift to the position illustrated in FIG. 21. The arm 235b does not engage the trip arm 239b when the vane 233 is in the position of FIG. 20 and by the time the diverter reaches the position of shifting the end of the arm 235b is past the depending section 239i of the arm 239b, so the arm merely shifts underneath the trip arm 239b. Spring 237, of course, retains the diverter vane 233 in the shifted position as the diverter carriage continues to move.

Shifting of the diverter vane 233 does not occur when the diverter carriage 224 is carried past the trip arms in the opposite direction. Instead the trip arm engaged by the arm 235a or 235b merely rides up as the arm slides along the under surface. When the diverter vane 233 is in the position of FIG. 21 and the diverter carriage 224 is carried past the trip arms in the direction of the arrow in FIG. 20, the trip arm 239b operates in conjunction with the actuator arm 235b to shift the diverter vane 233 back to its initial position. Trip arms may be mounted at any selected location along the conveyor where shifting of the vane 233 is desired. In some instances only a single trip arm will be provided when shifting of the vane 233 to a single position is desired each time the diverter is carried by the particular location.

FIGS. 23 and 24 disclose an automatic reversing mechanism of a simplified structure. A control cable 250 extends around a control pulley 251, preferably located in the house H, and around a second, free running pulley 251a mounted on the conveyor frame adjacent to the outboard end of the conveyor. Preferably, the cable 250 forms a closed loop having an upper reach 252 and a lower reach 253. The lower reach 253 extends through a pair of plates 254 mounted on the diverter 224 adjacent to its ends. As best illustrated in FIG. 20, the plates 254 are formed with open notches 256 in which the lower reach 253 of the cable 250 rests.

Mounted at selected points along the lower reach 253 are cable clamps 257 through 260. It should be understood that although there are four cable clamps illustrated in FIG. 24 greater or lesser numbers may be used as desired. The control pulley 251 is pivoted on the conveyor frame adjacent to a reversing switch 261 connected to control the direction of rotation of the motor used to power the diverter, for example the motor 248f at FIGS. 18 or 19.

The reversing switch is provided with an operating arm 262 movable from the full line position of FIG. 25 to the phantom line position. In one position the motor is caused to rotate in one direction and in the other position the motor is caused to rotate in the opposite direction. The spring 263 is anchored at one end at 264 on the pulley 251 and at the other end at 265 on the arm 262. When the pulley 251 is rotated in an anticlockwise direction from the position illustrated in FIG. 25 the spring 263 stretches out until the point 264 moves past the point 264a and then continued movement of the pulley 251 causes the arm 262 to be snapped over to the phantom position and produces rapid or almost instantaneous operation of the reversing switch 261. Subsequently when the control pulley 251 is rotated in a clockwise direction back to its initial position a snap action again occurs returning the control switch arm 262 to its full line position.

Referring now to FIG. 24, assuming the diverter 224 is in the position illustrated and is moving to the right the diverter moves relative to the lower reach 253 of the cable 250 causing the cable to slide with respect to the end plates 254. When the right end plate 254 engages the cable clamp 260 and cable is carried with the diverter causing anticlockwise rotation of the pulley 251. This causes the reversing switch to operate and reverses the direction of rotation of the motor powering the diverter and causes the diverter to begin to move to the left. When the left-hand plate 254 engages the cable clamp 259 clockwise rotation of the control pulley 251 occurs and the motor is again reversed. Consequently, when the system is in the condition illustrated in FIG. 24 the diverter is reciprocated back and forth through a distance determined by the location of the cable clamps 259 and 260.

When it is desired to change the location or the length of the reciprocation it is merely necessary to pull a support cable 266 which is connected to the lower flight at 267 and extends up over a pulley 268. The end of the cable 266 is in the house H and permits the operator to remotely control the location or length of the reciprocation of the diverter. For example, if it is desired to have the diverter reciprocate between the cable clamps 257 and 260, the control cable 266 is pulled to raise the clamps 258 and 259 clear of the end plates 254. When this is done the diverter will reciprocate back and forth between the cable clamps 257 and 260.

On the other hand if it is desired to cause the diverter to reciprocate between the cable clamps 257 and 258 the control cable 266 is pulled while the diverter is moving to the left so that the diverter will bypass the two cable clamps 258 and 259 and is then released when the diverter is located between the cable clamps 257 and 258. Subsequently, the reciprocation of the diverter will occur between these two latter cable clamps.

It should be understood that if desired additional cable clamps and additional lifting cables can be located at various desired locations along the control cable. Also, the cable clamps can be loosened and moved along the cable to provide easy adjustment of the system. Preferably, the cable 250 is clamped to the pulley 251 by a clamp screw 269 to insure that no slippage can occur between the cable and the pulley 251. This insures that accumulated slippage cannot cause the machine to go out of adjustment. Also, if desired, a spring may be located in the upper reach 252 to insure that proper tension is maintained in the control cable 250.

It will now be apparent that the present invention provides an improved method for delivering a load or burden to a point of use. Although the apparatus of the invention is constructed from simple and easily obtained components, the end result is a highly flexible and versatile piece of equipment which requires a minimum of personal supervision for its operation and maintenance.

While the foregoing describes a presently preferred embodiment of this invention and several modifications thereof, it is understood that the invention may be practiced in still other forms.

What is claimed is:

1. A diverter carriage for animal feed adapted to be threaded about a horizontally-directed belt for relative horizontal movement therewith and to divert sideways said feed into feedbunks and the like, said carriage comprising a base plate and an overlying plow section adapted to receive the belt therebetween, said base plate thereby supporting the belt and carrying restraining means to retain the plate and belt in substantial registry, said plow section including a pivotally mounted vane having an initial burden-contacting portion at an angle of no more than 45 degrees with respect to the direction of movement of the belt, and a V-shaped deflector cooperating with said vane to define a continuation thereof, and vertically yieldable support means for each of said vane and V-shaped deflector to accommodate a vertical, floating action of each upon relative movement of the belt therebetween and relative to said base plate and plow section.

2. A conveyor system comprising a horizontally extending belt having a load bearing reach, means driving said belt so that a burden placed on one end of said reach is carried along said reach, a shiftable diverter assembly mounted for movement along said reach and operable in a first condition to engage such burden carried by said reach and discharge it off one side of said reach and operable in a second condition to engage such burden and discharge it off the other side of said reach, and operating means operable to shift said diverter assembly from one to another of said first and second conditions at a predetermined location along said reach.

3. A conveyor system as set forth in claim 2 wherein said diverter assembly includes a V-shaped deflector symmetrically positioned over said reach with its apex facing said one end of said reach, and a shiftable vane pivoted substantially adjacent one end thereof for pivotal movement about a vertically extending axis aligned with said apex, the other end of said vane extending to said other side of said reach when said diverter assembly is in said first condition and extending to said one side of said reach when said diverter assembly is in said second condition.

4. A conveyor system as set forth in claim 2 wherein said operating means includes a trip element mounted at a fixed location along said reach, said trip element engaging a portion of said diverter assembly and operating in response to movement of said assembly along said reach to shift said diverter assembly from one to another of said first and second conditions.

5. A conveyor system as set forth in claim 4 wherein said trip element operates to shift said diverter assembly only when said assembly is moving in one direction relative to said fixed location.

6. A conveyor system as set forth in claim 4 wherein said diverter assembly includes an actuating arm extending laterally therefrom and positioned to engage an associated trip element when said diverter assembly is in said first condition or said second condition.

7. A conveyor system as set forth in claim 6 wherein said trip element is normally located in an operating position and is mounted so that it is free to move in one direction therefrom, said trip element including a downwardly extending portion proportioned so that it is engaged on one side by an associated actuating arm when said diverter assembly moves past said fixed location in said one direction and so that it is engaged on its other side when said diverter assembly moves past said fixed location in the opposite direction, said trip element being moved from its operating position by engagement with its associated actuating arm when engaged thereby on said other side.

8. A conveyor system as set forth in claim 6 wherein there are two trip elements at said fixed location and an actuating arm associated with each trip element, one of said trip elements and its associated actuating arm being proportioned so that they engage only when said diverter assembly is in said first condition, and the other trip element and its associated actuating arm being proportioned so they engage only when said diverter assembly is in said second condition.

9. A conveyor system according to claim 2 wherein said operating means comprises a pair of trip means located above said reach at said location, and means movable with said diverter assembly and engageable with one of said pair of trip means to cause shifting of said diverter assembly from one of said conditions to the other.

10. A conveyor system according to claim 9 characterized by means mounting each of said trip means to enable movement thereof between positions in which said trip means are effective to cause shifting of said diverter assembly and positions in which said trip means are ineffective to cause shifting of said diverter assembly.

11. In the combination of a carriage having a pivotally mounted member and adapted for travel in a general direction along a predetermined path, and cam means adapted to engage and pivot said member at a preselected point along said path; improved cam means comprising a pair of cam bars converging in the direction of said general movement, the cam bars having an extensible section at adjacent ends and a hinged section at their remote ends, said extensible sections permitting the cam bars to engage and move the pivotal member through a distance of at least one-half the width of the carriage, said hinged section being movable only in a direction opposite to said general direction and thereby adapted to pass said pivotal member when traveling in the opposite direction without pivoting said member.

12. The combination according to claim 11 characterized by said pivotally mounted member having means resiliently holding it in either of two opposite pivotal positions, the distance of movement of the pivotal member by said cam bars also being sufficient to move the pivotal member past dead center whereby said resilient means completes the pivoting of the member.

13. A drive system for a reciprocating carriage comprising a first pulley journaled for rotation about an axis, second and third pulleys journaled for co-rotation about a second axis spaced from said first axis, a tension roller journaled for rotation about a third axis spaced from said second axis, a flexible tension member connected to said carriage extending therefrom around said first pulley, from said first pulley around said second pulley, from said second pulley around said tension roller, from said tension roller around said third pulley, and from said third pulley back to said carriage, power means connected to reversibly drive at least one of said pulleys, and tension means connected to urge said tension roller in a direction away from said second axis.

14. A drive system as set forth in claim 13 wherein said tension roller is located on the side of said second axis toward said first axis.

15. A drive system as set forth in claim 14 wherein said tension means is a spring.

16. A drive system as set forth in claim 14 wherein said power means is connected to drive said second and third pulleys.

17. A drive system as set forth in claim 16 wherein fourth and fifth pulleys are mounted on said carriage, and said tension member extends from said first pulley around said fourth pulley to a first end anchored substantially adjacent to said first pulley and from said third pulley around said fifth pulley to another end anchored substantially adjacent to said third pulley.

18. A drive system as set forth in claim 14 wherein a power driven conveyor is provided, said carriage is mounted for reciprocation along said conveyor by said tension member, and a diverter operable to discharge a burden from said conveyor is mounted on said carriage.

19. A control system comprising a carriage, reversible power means connected to reciprocate said carriage, a reversing switch for reversing said power means, an elongated flexible control member having a reach extending substantially parallel to the direction of reciprocation of said carriage, a plurality of spaced projections secured to said control member in predetermined positions therealong, and said projections being operative to cause actuation of said reversing switch to reverse said power means in response to movement of said carriage in either direction.

20. A control system as set forth in claim 19 wherein said carriage is provided with an upwardly facing open slot in which said control member normally rests and slides.

21. A control system as set forth in claim 20 wherein remotely operated lift means are provided to lift the portions of said control member adjacent to selected projections out of said slot and clear of said surface.

22. A conveyor system comprising a belt having a reach movable in the direction of its length adapted to receive a burden at one location and to carry such burden in said direction, a diverter assembly reciprocable along said reach to discharge the burden carried by said reach laterally off the sides of said belt; said diverter assembly including a baseplate and an overlying diverter with said belt positioned therebetween, said diverter being movable between a first position in which it diverts said burden from one side of said belt to a second position in which it diverts said burden to the other side of said belt, said diverter including means engaging said belt on the side thereof opposite said baseplate and being movable toward and away from said baseplate.

23. A conveyor system as set forth in claim 22 wherein said diverter assembly includes vertically extending elements engageable with the edges of said reach to maintain registry between said reach and diverter assembly.

24. A conveyor system as set forth in claim 22 wherein said diverter assembly includes a frame, a pivot connecting said diverter to said frame for pivotal movement between said first and second positions, spring means connected to said diverter and effective to urge it toward one of said first and second positions from an intermediate position, and stop means carried by said frame and engaged by said diverter when in said first and second positions to restrain its movement to movement between said first and second positions.

25. A conveyor system as set forth in claim 24 wherein shift means are provided which are operable in response to movement of said diverter assembly to at least one predetermined location along said belt for shifting the diverter from one to another of said first and second positions.

26. A conveyor system as set forth in claim 22 wherein said diverter assembly includes a frame, pivot means connecting said diverter to said frame for pivotal movement around a pivot axis between said first and second positions, spring means connected to said frame on one side of said pivot axis and to said pivot means on the other side of said pivot axis, and means on said frame engaged by said pivot means when said diverter is in said first and second positions to restrain the movement of said diverter to movement between said first and second positions.

27. A conveyor system comprising a belt having a reach movable in the direction of its length and adapted to receive a burden at one location and carry such burden in said direction; a diverter assembly reciprocable along said belt to discharge the burden carried by said belt laterally off the sides of said belt, said diverter assembly including a baseplate and an overlying diverter with the belt positioned therebetween, and said diverter being movable between a first position in which it discharges said burden from one side of said belt to a second position in which it discharges said burden from the other side of said belt; a reversible motor; cable means including an elongate flexible member connected between said motor and diverter assembly and operable to move said diverter assembly in one direction when said motor operates in one direction and operable to move said diverter assembly in the opposite direction when said motor operates in the opposite direction, a reversing switch connected to reverse said motor, and actuating means associated with said cable means and operable to actuate said reversing switch when said diverter assembly is in predetermined positions along said belt.

28. A conveyor system according to claim 27 characterized by said reversing switch being located near an end of the path of travel of said diverter assembly and said actuating means operate said switch when said diverter assembly is adjacent each end of its path of travel.

29. A conveyor system according to claim 27 characterized by said means associated with said cable means including means for operating said reversing switch when said diverter assembly is at a location between the ends of its path of travel, and manually-operable means for selectively rendering said last-named means ineffective.

References Cited

UNITED STATES PATENTS 3,153,477   10/1964   Tipton _____ 198—185

EDWARD A. SROKA, Primary Examiner

PO-1050
(5/69)

UNITED STATES PATENT OFFICE
CERTIFICATE OF CORRECTION

Patent No. 3,522,876     Dated August 12, 1970

Inventor(s) Chester A. Purdy

It is certified that error appears in the above-identified patent and that said Letters Patent are hereby corrected as shown below:

Column 2, line 7, change "divercter" to --diverter--; and
          line 57, change "where" to --wherein--.

Column 4, line 5, change "designated" to --designed--.

Column 6, line 71, change "desirable" to --desired--.

Column 7, line 50, change "asembly" to --assembly--.

Column 8, line 1, change "vintage" to --windage--; and
          line 2, after "animals" insert --from touching the belt or diverter assembly and to constitute a barrier--.

Column 9, line 51, change "then" to --than--.

Column 11, line 29, after "diverter" insert --assembly--.

Column 12, line 20, change "approximately" to --approximating--.

Column 13, line 27, after "diverter" insert --vane--.

Column 14, line 19, change "and" to --the--; and
          line 48, capitalize "subsequently".

SIGNED AND
SEALED
DEC 15 1970

(SEAL)
Attest:

Edward M. Fletcher, Jr.
Attesting Officer

WILLIAM E. SCHUYLER, JR.
Commissioner of Patents